(12) United States Patent
Tsai et al.

(10) Patent No.: US 7,298,316 B2
(45) Date of Patent: Nov. 20, 2007

(54) APPARATUS AND METHOD FOR INSTANTLY AUTOMATIC DETECTING CLUTTER BLOCKS AND INTERFERENCE SOURCE AND FOR DYNAMICALLY ESTABLISHING CLUTTER MAP

(75) Inventors: Ming-Fa Tsai, Taipei Hsien (TW); Zheng-Cheng Chang, Taoyuan (TW); Ming-Wey Chen, Taoyuan (TW)

(73) Assignee: Chung Shan Institute of Science and Technology, Armaments Bureau M.N.D., Taoyuan (TW)

( * ) Notice: Subject to any disclaimer, the term of this patent is extended or adjusted under 35 U.S.C. 154(b) by 175 days.

(21) Appl. No.: 11/314,789

(22) Filed: Dec. 19, 2005

(65) Prior Publication Data

US 2007/0139258 A1    Jun. 21, 2007

(51) Int. Cl.
*G01S 13/00* (2006.01)
*G01S 13/52* (2006.01)

(52) U.S. Cl. ............... 342/159; 342/160; 342/161; 342/162; 342/163; 342/33; 342/34

(58) Field of Classification Search ........ 342/159–164, 342/26, 29, 62, 63, 74, 90, 181, 460, 176, 342/33–36; 340/601
See application file for complete search history.

(56) References Cited

U.S. PATENT DOCUMENTS

| | | | | |
|---|---|---|---|---|
| 3,774,202 A | * | 11/1973 | Nolette | 342/25 F |
| 3,902,171 A | * | 8/1975 | Toth | 342/90 |
| 4,068,231 A | * | 1/1978 | Wilmot | 342/90 |
| 4,074,264 A | * | 2/1978 | Wilmot | 342/90 |
| 4,386,353 A | * | 5/1983 | Bleijerveld et al. | 342/91 |
| 4,540,985 A | * | 9/1985 | Clancy et al. | 342/90 |
| 4,749,994 A | * | 6/1988 | Taylor, Jr. | 342/195 |
| 4,829,308 A | * | 5/1989 | Tol et al. | 342/185 |
| 4,845,500 A | * | 7/1989 | Cornett et al. | 342/90 |
| 4,851,850 A | * | 7/1989 | Milan et al. | 342/90 |
| 4,940,988 A | * | 7/1990 | Taylor, Jr. | 342/93 |
| 5,243,349 A | * | 9/1993 | Mims | 342/25 A |
| 5,907,568 A | * | 5/1999 | Reitan, Jr. | 342/26 B |
| 6,307,501 B1 | * | 10/2001 | Wills et al. | 342/161 |
| 6,717,545 B2 | * | 4/2004 | Dizaji et al. | 342/93 |
| 6,809,682 B1 | * | 10/2004 | Madewell | 342/160 |
| 7,154,433 B1 | * | 12/2006 | Madewell | 342/160 |

* cited by examiner

*Primary Examiner*—Thomas H. Tarcza
*Assistant Examiner*—Hien Ly
(74) *Attorney, Agent, or Firm*—J.C. Patents

(57) ABSTRACT

An apparatus for detecting clutter blocks and an interference source for dynamically establishing a clutter map includes a clutter block detecting module accumulates a plurality of range cell data of each detecting area, and compares the accumulated value with a clutter block level to define the position of a clutter block; a interference source detecting module accumulates all range cell data in each radar beam area, and compares the accumulated value with an interference source reference level to detect whether any interference source exists; and a clutter map establishing module saves the clutter maps on different beam areas in three memory blocks. When one clutter map cell is extracted, the clutter map cells on different beam areas neighboring with the beam area saving extracted clutter map cell are also extracted. The largest value among the extracted clutter map cells is being a clutter threshold value of a detected target.

20 Claims, 12 Drawing Sheets

APPARATUS AND METHOD FOR INSTANTLY AUTOMATIC DETECTING CLUTTER BLOCKS AND INTERFERENCE SOURCE AND FOR DYNAMICALLY ESTABLISHING CLUTTER MAP

BACKGROUND OF THE INVENTION

1. Field of Invention

The present invention relates to a radar system technology, and particularly to an apparatus and a method for instantly automatic detecting clutter blocks and an interference source and for dynamically establishing a clutter map.

2. Description of the Related Art

In a radar system, filtering and restraining clutter and electronic countermeasures are two subjects. In a scanning space of radar, no matter desired target (e.g. planes) or undesired target (e.g. mountain, cloud, rain etc.) reflects EM wave of radar system and generates echo signal received by an antenna of the radar system. So-called clutter is the echo signal generated by the undesired object. The interference of clutter affects probability for detecting desired target for a radar system, and results the false alarm rate of erroneous target increasing. To establish a clutter map is a method for effectively filtering and restraining the clutter. The said clutter map is a clutter data recorder in scanning area of a radar system. That is, recording intensity of clutter generated by an object in a scanning area of a radar system to establish a clutter intensity space map in the scanning area. The clutter map is used to generate a detection threshold.

Conventionally, the area established by clutter map is all scanning area of a radar system or partial stationary area. In fact, a valid area of a clutter map is a range generating clutter affecting a radar system for detecting target, so the clutter map only establishes the area where a clutter exits. Furthermore, what is called interference map records an area with an object generating clutter in a scanning area of a radar system. In other words, the interference map is a spatial map recording a distribution of a plurality of clutter blocks in the scanning of the radar system. It is using a clutter map memory with limited capacitance effectively and flexibly by establishing clutter map only for an area indicated a clutter block according to an interference map. In addition, for the area indicated clutter block according to the interference map, the radar selects different searching mode, like moving target indication (MTI), to filter clutter.

SUMMARY OF THE INVENTION

An object of the present invention is to provide an apparatus and a method for automatically detecting a clutter block capable of deciding where there is an object producing clutter in the scanning area of the radar system.

Another object of the present invention is to provide an apparatus and a method for instantly detecting an interference source capable of deciding whether an interference source interfering the operation of the radar system exists.

A further object of the present invention is to provide an apparatus and a method capable of producing a clutter threshold value for detecting a target.

The present invention provides an apparatus for instantly automatic detecting clutter blocks and an interference source and for dynamically establishing a clutter map, which is suitable for a radar system and the apparatus provided by the present invention includes at least:

1. A clutter block detecting module receiving a plurality of range cell data. Wherein, each range cell data represents echo intensity at a different distance position of a radar beam area with an elevation and an azimuth in the analyzing space of the radar system. Besides, the clutter block detecting module would divide a radar beam area into a plurality of detecting areas according to a predetermined distance. When the accumulated value of a range cell data in a detecting area is larger than a clutter block level, the detecting area is defined as a clutter block by the clutter block detecting module.

2. An interference source detecting module. The interference source detecting module also receives the above-described range cell data and accumulates the range cell data in each radar beam area. The accumulated value is compared with an interference source reference level to decide whether an interference source exists.

3. A clutter map establishing module generates a plurality of clutter map cells according to the range cell data. Wherein, the clutter map cells on different beam area store in three memory blocks sequentially. When one of the clutter map cells is extracted, two clutter map cells on adjacent beam area are also extracted. The largest value among the three clutter map cells is regarded as a clutter threshold value to detect the target.

In another embodiment, the present invention provides a method for instantly detecting clutter blocks, which is suitable for a radar system too. The method for instantly detecting clutter blocks provided by the present invention includes the following steps. First, a plurality of range cell data is received, wherein each range cell data represents echo intensity at a different distance position of a radar beam area with an elevation and an azimuth in the detection space of the radar system. Next, each radar beam area is divided into a plurality of detecting areas and each detecting area includes data of a preset number of range cells. Afterwards, all range cell data of each detecting area are accumulated to obtain a corresponding accumulated value. Further, the accumulated value of each detecting area is compared with a clutter block level to produce a comparison result. Finally, in the present invention, the comparison result is used for deciding which detecting area is regarded as a clutter block. The distribution of the clutter blocks is an interference map.

On the other hand, the method for instantly detecting an interference source provided by the present invention is also suitable for a radar system. According to the method, the following steps are included. First, a plurality of the above-mentioned range cell data is received. Afterwards, all range cell data of each radar beam area are accumulated to obtain a corresponding accumulated value. Further, the accumulated value of each radar beam area is compared with an interference source reference level to produce a comparison result. Finally, in the present invention, the comparison result is used for deciding in which orientation of radar beam area an interference source exists.

The present invention further provides an apparatus for establishing a clutter map. The apparatus includes a range cell collapsing circuit, a dynamically updating circuit, a memory device and a threshold value generating circuit. Wherein, the range cell collapsing circuit receives a plurality of the abovementioned range cell data for producing data of a plurality of range collapsing cells. Each range collapsing cell comprises a corresponding clutter map collapsing cell (CMCC) and two clutter map spreading cells (CMSCs) adjacent to the CMCC; wherein each CMCC includes a first number of range cells, while each CMSC includes a second number of range cells where CMCC□2CMSC. The range cell collapsing circuit selects the largest value in each CMCC and the CMSCs adjacent to the CMCC as the value of the corresponding range collapsing cell. Besides, the dynamically updating circuit is coupled to the output of the range cell collapsing circuit for instantly and dynamically updating the value of each clutter map cell. The memory device receives the output from the dynamically updating circuit; and the memory device includes a plurality of memory blocks, and each memory block has a plurality of memory regions for sequentially storing data of clutter map cells of all radar beam areas on each elevation layer. The threshold value generating circuit would, from the memory device, select the largest value among each selected clutter map cell and the clutter map cells with the corresponding position in the radar beam areas adjacent to the selected beam area as a clutter threshold value for detecting the target.

The present invention further provides a method for establishing a clutter map. First, the above-described range cell data are received. Next, the range cells of each radar beam area are collapsed into a plurality of range collapsing cells, where each range collapsing cell includes a preset number of range cells. Then, the range collapsing cell and a clutter map cell at the corresponding position re-compose a new clutter map cell according a preset proportion. Afterwards, all clutter map cells of the selected elevation layer are sequentially stored into a memory space. Wherein, the memory space has a plurality of memory blocks and each memory block has a plurality of memory regions for storing all clutter map cells. Further, each clutter map cell is sequentially selected from the memory space and the largest value among each selected clutter map cell and the clutter map cells with the corresponding position in the radar beam areas adjacent to the selected beam area is regarded as a clutter threshold value for detecting the target.

The interference source detecting module provided by the present invention is capable of detecting whether an interference source exists in all orientations. If an interference exists, the system will process an adaptive processing to the interference source. For example, starting an electronic counter-countermeasures processing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Prior to illustrating the present invention, a brief introduction of the detecting scheme for a normal radar system is provided for those skilled in the art to fully understand the novelty and spirit of the present invention.

Figure 1:
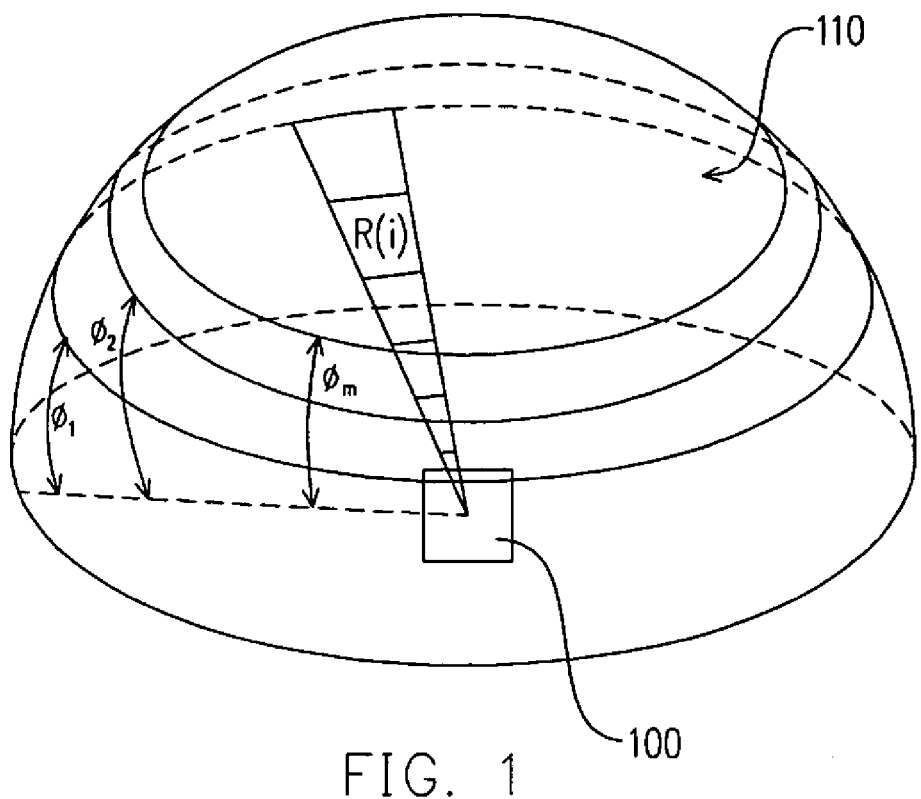
FIG. 1 is a schematic cubic drawing of a detection space of a radar system.

In general, a radar system occupies a detection space; when an object intrudes into the detection space, the object will be sensed by the radar system. FIG. 1 is a schematic cubic drawing of a detection space of a radar system. Referring to FIG. 1, a radar system 100 has a detection space 110, which is encompassed by scanning of the electromagnetic wave with an effective sensing range emitted by the radar system 100. When an airplane, for example, enters into the detection space 110, the airplane will reflect the electromagnetic wave emitted by the radar system 100 with an echo signal. The radar system 100 will decide whether an object exists within the detection space 110 in accordance with the echo signal intensity, and decide the distance between the target and radar system 100 according to the time difference during the time of radiating EM waves to the time of radar system 100 receiving the echo signal.

It is known to those skilled in the art that a radar system scans the detection space thereof not in one-time manner, but uses the radar system as center and divides the detection space into a plurality beam spaces. The radar system orients toward some orientation or some elevation scanning and positioning space coordinate of the target by known scan orientation and calculated distance of target. The main functions of the radar system are detecting target and marking the space coordinate of the target.

In FIG. 1, when radar system 100 scans the detection space 110, the radar system 100 divides the detection space 110 into different elevation layer, for example $\phi 1$, $\phi 2$, and $\phi_m$, according to beam angle of vertical orientation of EM waves generated by the radar system 100. Noticeably, in FIG. 1, an elevation increment, for example, the difference between $\phi_2$ and $\phi_1$ is very big for showing the purpose in exaggeration manner so those skilled in the art can understand it.

Figure 2:
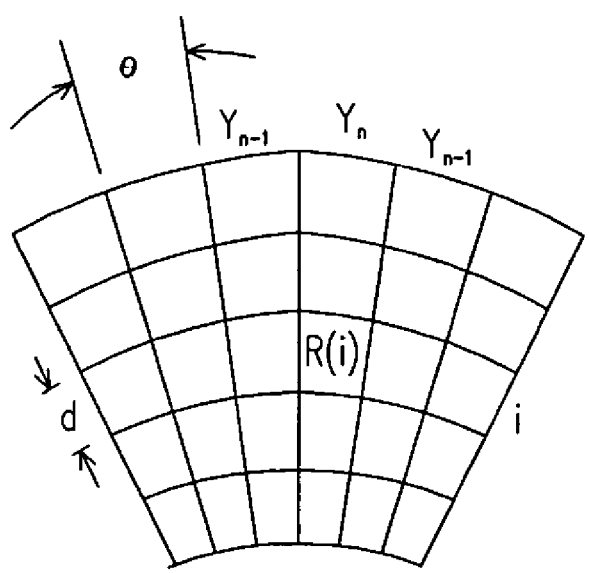
FIG. 2 is the localized top view of the detection space in FIG. 1.

The definition of so-called "range cell" must be given first. FIG. 2 is the localized top view of the detection space in FIG. 1. Referring to FIG. 2, it shows one of different elevation layers, which feature in different elevation $\phi_1$, $\phi_2$ and $\phi_m$. Each elevation layer in a detection space can be divided into a plurality of beam area, for example $Y_n$, according to an azimuth θ of horizontal orientation of EM wave generated by a radar, where n is a positive integer indicating the n-th radar beam area.

Each radar beam area is further divided into a plurality of range cells according to a predetermined radar range resolution d. The data contained by each range cell is just the echo intensity at the corresponding position.

Figure 3:
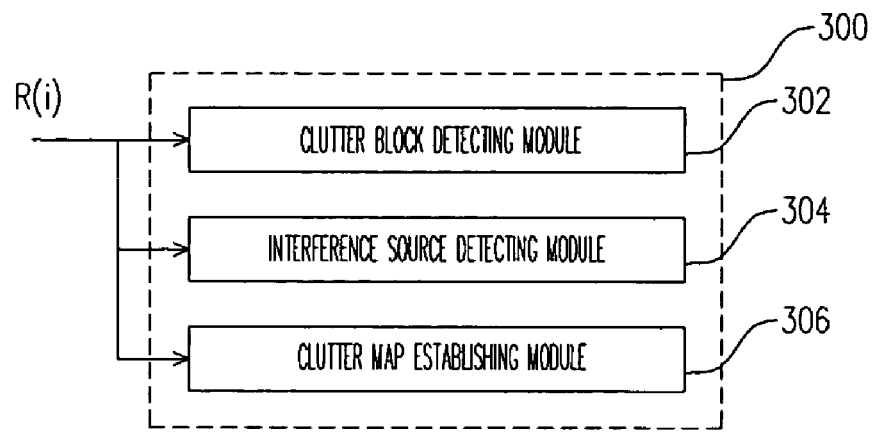
FIG. 3 is a block diagram of an apparatus for instantly automatic detecting clutter blocks and an interference source and for dynamically establishing a clutter map according to an embodiment of the present invention.

FIG. 3 is a block diagram of an apparatus for instantly automatic detecting clutter blocks and an interference source for dynamically establishing a clutter map according to an embodiment of the present invention. Referring to FIG. 3, an apparatus 300 provided by the present invention includes a clutter block detecting module 302, an interference source detecting module 304 and a clutter map establishing module 306, all of which are able to receive a plurality of range cell data R(i).

The clutter block detecting module 302 would divide all range cells of each radar beam area into a plurality of detecting areas according to a predetermined space as shown in FIG. 2. For example, every N range cells are regarded as a detecting area, where N is a positive integer. Afterwards, the clutter block detecting module 302 accumulates all range cell data of each detecting area. Further, the accumulated value is compared with a clutter block level. If the accumulated value of any detecting area is larger than the clutter block level, the detecting area is defined as a clutter block.

Figure 4:
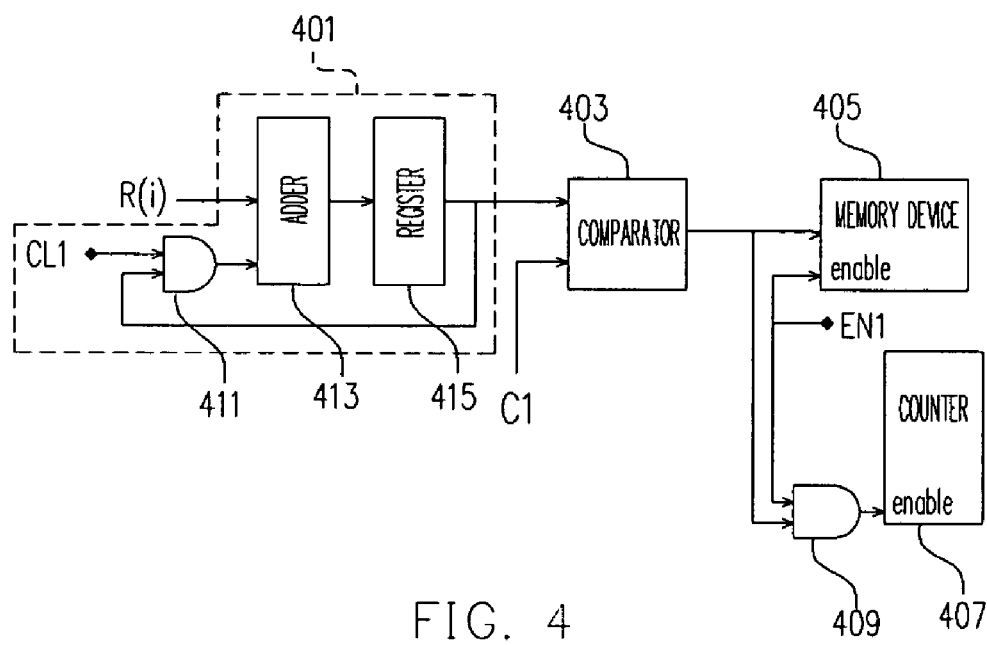
FIG. 4 is a circuit block diagram of a clutter block detecting module according to an embodiment of the present invention.

FIG. 4 is a circuit block diagram of a clutter block detecting module according to an embodiment of the present invention. Referring to FIG. 4, the clutter block detecting module includes an accumulated unit 401 which receives range cell data R(i) through the input of the clutter block detecting module. The accumulated unit 401 accumulates every N pieces of the range cell data R(i). Then the accumulated value is outputted to a comparator 403, where the accumulated value from the accumulated unit 401 is compared with a clutter block level C1. If the output from the accumulated unit 401 is larger than the clutter block level C1, the comparator 403 will produce a logic-1 output. Contrarily, the comparator 403 will produce a logic-0 output.

The accumulated unit 401 can include an AND gate circuit 411, an adder 413 and a register 415. Wherein, an input end of the AND gate circuit 411 is coupled to a clearance signal CL1, while another input end receives the output from the accumulated unit 401. The adder 413 serves for receiving the range cell data R(i) and the output from the AND gate circuit 411, adding the above-mentioned data and outputting the added result to the register 415. If the output value of the register 415 is larger than clutter block level, the comparator 403 outputs logic-1 to define the detecting area being a clutter block. Oppositely, the comparator 403 outputs logic-0 to define the detection area being a non-clutter block.

The clutter block detecting module 302 can further include a memory device 405 and a counter 407. In the embodiment, the memory device 405 can be a memory and is used for storing the output from the comparator 403. Furthermore, the counter 407 receives the output of the comparator 403 through a AND gate 409 to count the times of logic-1 generated by comparator 403.

In the embodiment, both the memory 405 and the counter 407 are comprised with an enabling end 'enable', respectively. Wherein, the enabling end of the memory 405 is coupled to an enabling signal EN1, while the enabling end of the counter 407 is coupled to the output end of the AND gate circuit 409. One of input ends of the AND gate circuit 409 is coupled to the output of the comparator 403, while another input end thereof is coupled to the enabling signal EN1.

Figure 5:
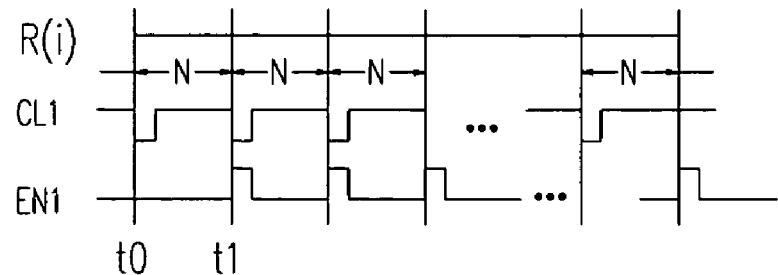
FIG. 5 is a timing chart corresponding to the clutter block detecting module in FIG. 4.

FIG. 5 is a timing chart corresponding to the clutter block detecting module in FIG. 4. Referring to FIGS. 4 and 5, at a time point t0 the clearance signal CL1 is logic-0, so that the AND gate circuit 411 is able to produce a zero output to the adder 413. Meanwhile, the first range cell data R(1) is sent to the adder 413. The adder 413 adds the range cell data R(1) to the output from the AND gate circuit 411, followed by sending the result to the register 415. Since after the first range data R(1) is sent to the register 415, the clearance signal CL1 is transited to logic-1, so that the following range cell data R(i) sent to the register 415 are continuously accumulated to the sum of the range cell data R(i) previously arrived at the adder 413.

Once N pieces of range cell data R(i) are accumulated by the adder 413, i.e. all range cell data R(i) of a detecting area are accumulated, the clearance signal CL1 would be transited to logic-0 again at time point t1 and the enabling signal EN1 is transited to a high-level, so that the memory 405 are enabled and the output result of the comparator 403 is written in memory 405. On the other side, once the output result of the comparator is logic-1, it is indicating clutter block and the output of the counter 407 adding 1 at enabling signal EN1 being high level. Meanwhile the number of clutter block increases 1. At this time, another n pieces of range cell data R(i) are sent to the adder 413 together with repeating the above-described operations of the accumulated unit 401. According to the counting value of the counter 407, the capacity of the clutter map memory to store the clutter map marked a clutter block area is determined. (The counter value of the counter 407 is used for determining the capacity of the clutter map memory for constructing the clutter map marked with clutter blocks.)

Figure 6A:
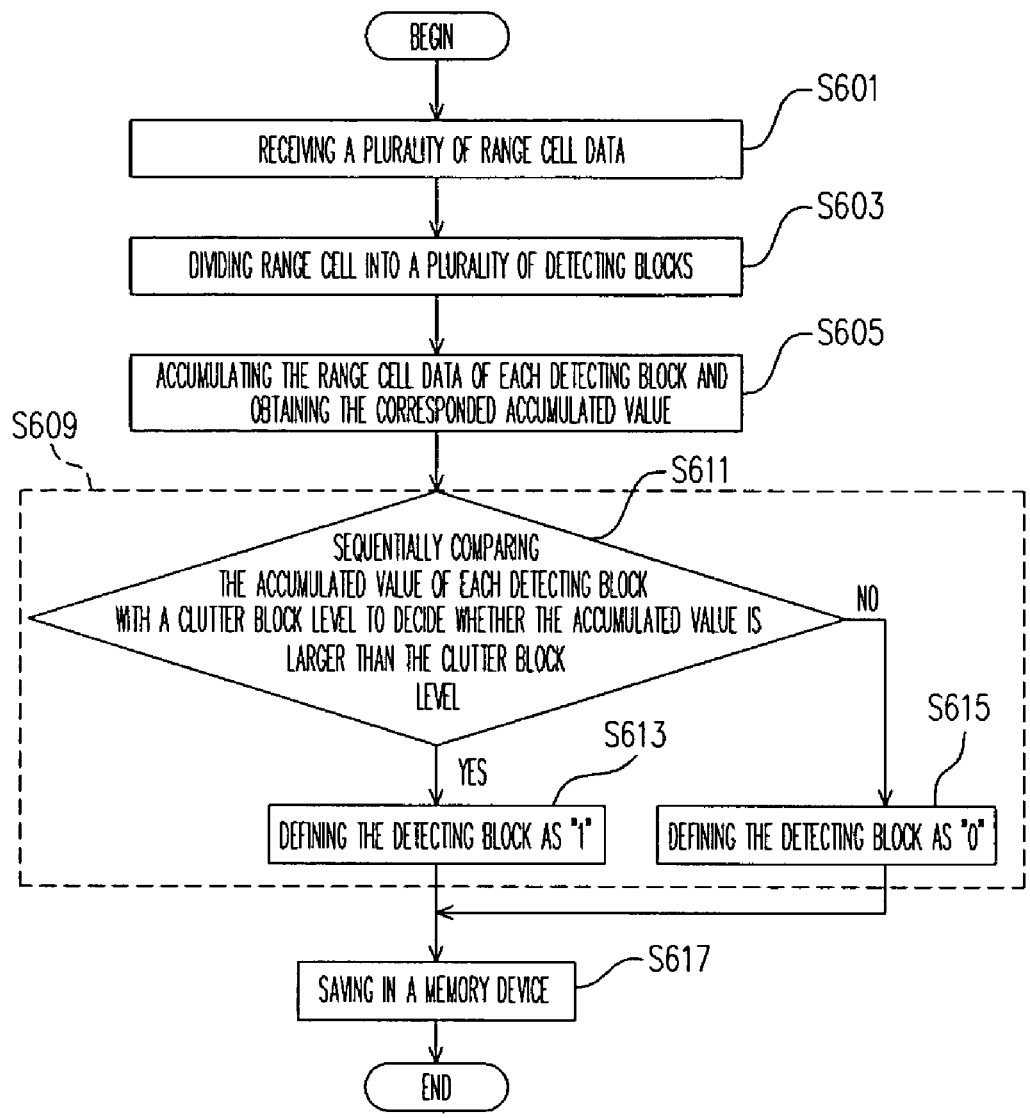
FIG. 6A is a flowchart of a method for instantly detecting clutter blocks according to an embodiment of the present invention.
Figure 6B:
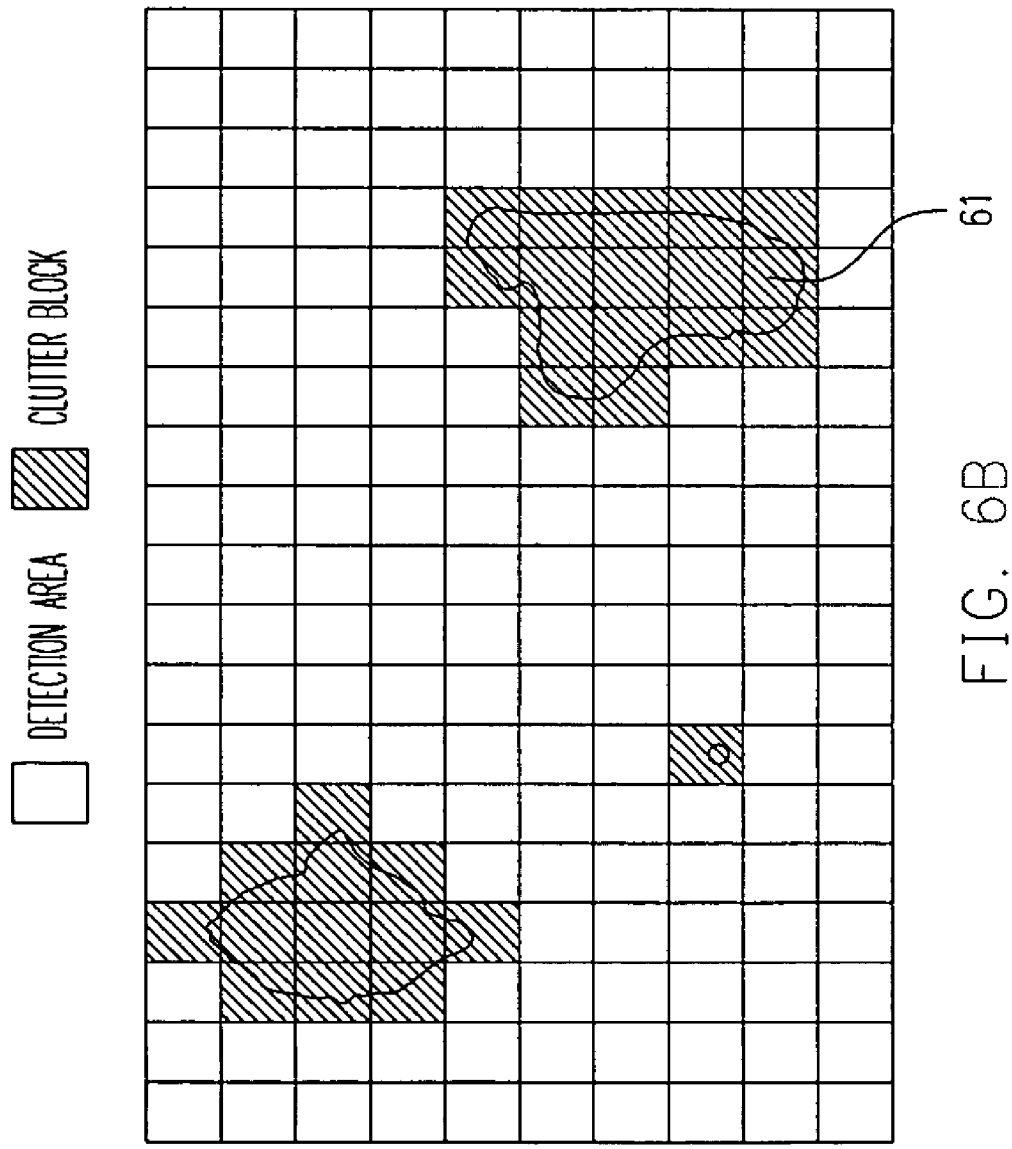
FIG. 6B is a interference diagram according to an embodiment of the present invention.

FIG. 6A is a flowchart of a method for instantly detecting clutter blocks according to an embodiment of the present invention, and FIG. 6B is a interference diagram according to an embodiment of the present invention, wherein the method in the FIG. 6A is suitable, but not limited to, for the above-described clutter block detecting module 302. Referring to FIGS. 6A and 6B, first at step S601, a plurality of range cell data is received. Next at step S603, all received range cells are divided into a plurality of detecting areas as the block areas in the FIG. 6B according to a predetermined space, wherein the detecting areas are equivalent to the above-described detecting areas and the predetermined space in the embodiment is, for example, 500 meters or one kilometer.

After the range cells are divided into a plurality of detecting areas, at step S605, all range cell data of every detecting area are accumulated to obtain a corresponding accumulated value. Further, at S611, based on the accumulated value, the processed detecting area can be identified whether it is a clutter block or not.

It is assumed that a terrain object or cloudy and raining area exists at the position where the processed detecting area locates, the electromagnetic wave emitted by the radar system would be reflected by the terrain object and an echo signal, i.e. the content of the range cell, is produced. After the radar system receives the echo signal, through the above-described steps from S601 to S605, an accumulated value is obtained. Furthermore, at step S611, the accumulated value is compared with a clutter block level. In general, a terrain object or a cloudy and raining area would produce a stronger echo data, thus the above-described accumulated value is always larger than the clutter block level. Finally, at step S613, it is decided that outputting logic-1 data to define the detecting area is a clutter block.

For example, in the FIG. 6B, after the electromagnetic wave emitted by the radar system reflected by an object 61, the echo signal that is larger than the clutter threshold value is generated. Meanwhile, the present invention decides the detecting areas around the object 61 are clutter blocks.

Contrarily, if the above-mentioned accumulated value is less than the clutter threshold value, it is concluded that the generated clutter strength is not strong enough to affect the target detection at the detecting area position. So outputting logic-0 data to define the detecting area is not a clutter block (e.g. the blank blocks in the FIG. 6B) as the described in the step S615. Then, as the described in step S617, the determined result that is the logic-1 or logic-0 data is saved in a memory. By means of the above-described method, it is able to record the position of the clutter blocks to the detection space of the radar system.

Continuing to FIG. 3, in response to the electronic wars that are concerned by many countries today, various anti-radar techniques are developed. One of the techniques employs an interference source to emit an interference signal for confusing the detection of the radar system. Therefore, an interference source detecting module 304 of the present invention is provided to decide whether an interference source exists at all directions of radar beam areas or not.

Figure 7:
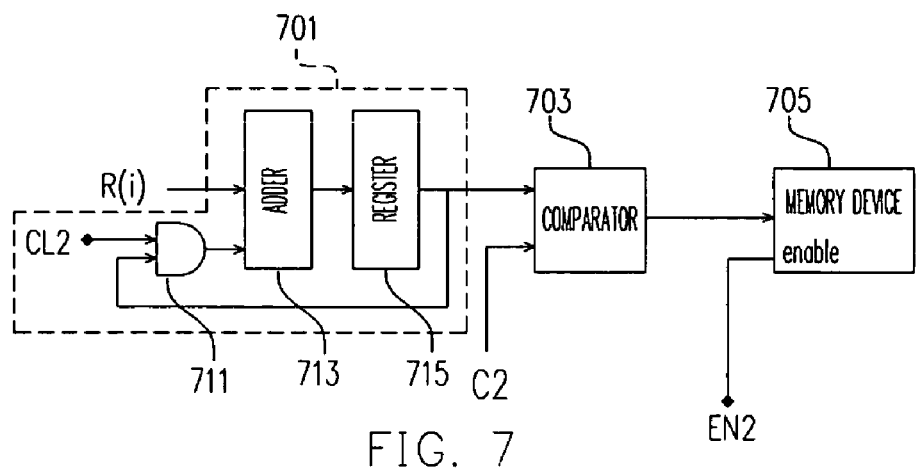
FIG. 7 is a circuit block diagram of an interference source detecting module according to an embodiment of the present invention.

FIG. 7 is a circuit block diagram of an interference source detecting module according to an embodiment of the present invention. Referring to FIG. 7, similarly to the above-described clutter block detecting module 302, the interference source detecting module 304 also includes an accumulated unit 701, a comparator 703 and a memory device 705. Wherein, the memory device 705 has an enabling end 'enable' for receiving an enabling signal EN2. The couplings of all function blocks are similar to the clutter block detecting module 302 in FIG. 4 and thus the detail is omitted herein for simplicity. A unique point is that the output from the accumulated unit 701 is compared with an interference source reference level C2 by the comparator 703. If the output from the accumulated unit 701 is larger than the interference source reference level C2, the comparator 703 will produce a logic-1 output; otherwise, a logic-0 output is given by the comparator 703.

The accumulated unit 701 also includes an AND gate circuit 711, an adder 713 and a register 715. Wherein, an input end of the AND gate circuit 711 receives the clearance signal CL2 and another input end thereof is coupled to the output from the accumulated unit 701. The couplings of the other circuit blocks can refer to the depiction of the accumulated unit 401.

Figure 8:
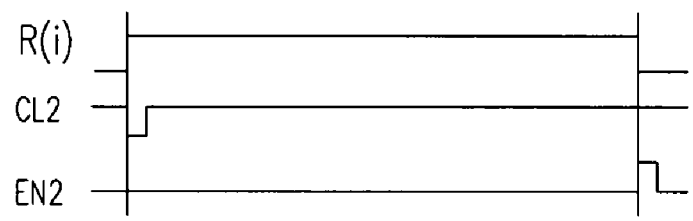
FIG. 8 is a timing chart corresponding to the interference source detecting module in FIG. 7.

FIG. 8 is a timing chart corresponding to the interference source detecting module in FIG. 7. Referring to FIGS. 7 and 8, when the first range cell data R(1) is sent to the adder 713 of the accumulated unit 701, the clearance signal CL2 is logic-0, which makes the adder 713 to send the first range cell data R(1) to the register 715. Due to a low-level of the enabling signal EN2 at the point, the memory device 705 is disabled. After the first range cell data R(1) passes the register 715, the clearance signal CL2 is transited to logic-1. In this way, the range cell data input to the adder 713 are accumulated to the previous sum of the range cell data input to the adder 713.

Once all range cell data of a radar beam area are accumulated, the comparator 703 compares the accumulated value and the interference source reference level. At this time, the enabling signal EN2 goes to high resulting the memory 705 being enabled, and the output result of comparator 703 is written in memory 705. If the accumulated value is larger than the interference source reference level, a logic-1 output is produced by the comparator 703 to define an interference source existing in the orientation of the beam area. Appositively, a logic-0 output is produced by the comparator 703 to define no interference source existing in the orientation of the beam area. The energy of echo signal of radar is in inverse proportion with distance quartically, and the interference energy of interference source for the radar is in inverse proportion with distance squarely. If the interference source exists, the energy of echo signal in the search window will be abnormally large. An accumulated value of the energy of the echo signal is used to determine whether the interference source exists or not. Once an interference source is detected, the radar will execute appropriate processing.

Figure 9:
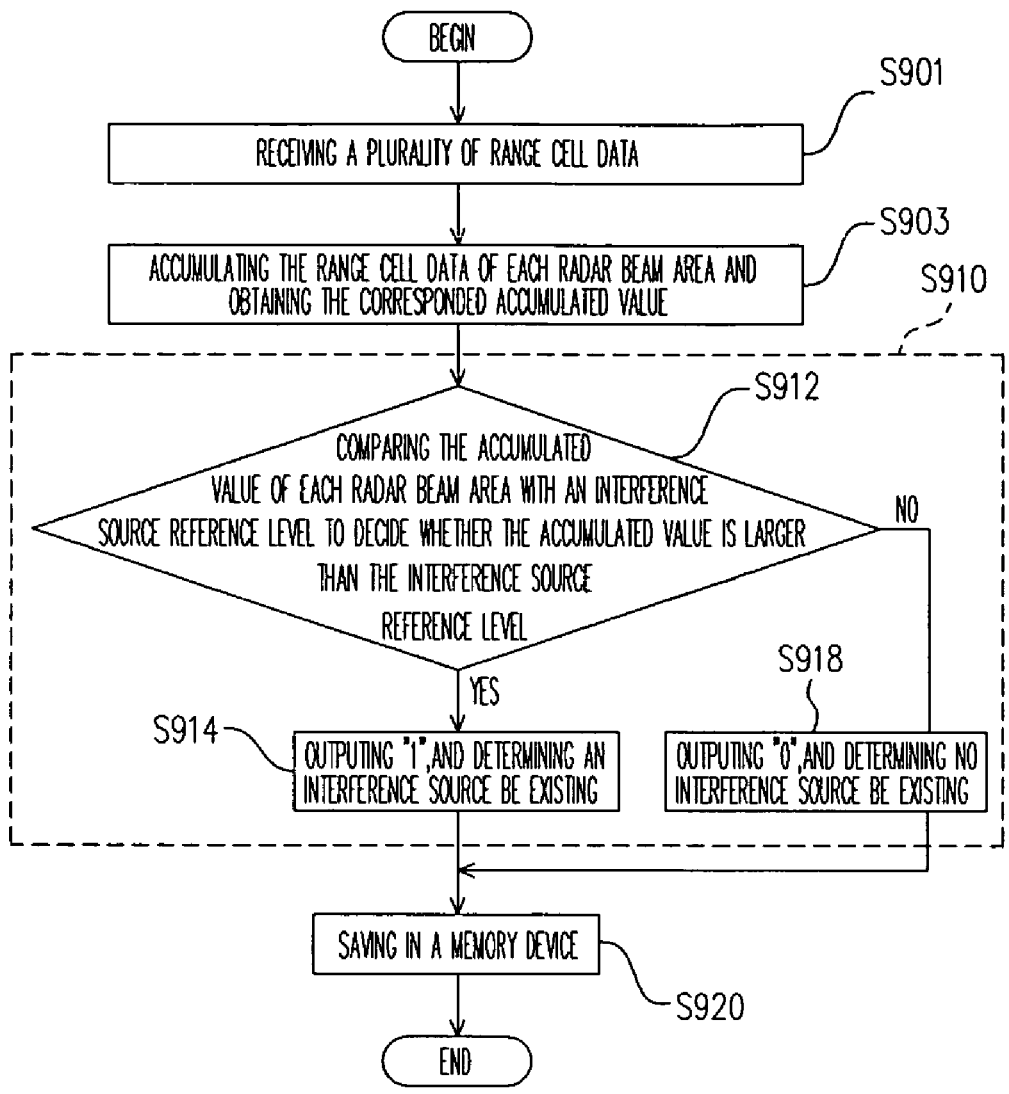
FIG. 9 is a flowchart of a method for instantly detecting interference sources according to an embodiment of the present invention.

FIG. 9 is a flowchart of a method for instantly detecting interference sources according to an embodiment of the present invention, which is suitable, but not limited to, for the interference source detecting module in FIG. 7. Referring to FIG. 9, the method for instantly detecting interference sources provided by the present invention has a first step, as step S901, receiving a plurality of range cell data. Next, as steps S903, all range cell data of the above described each radar beam area are accumulated, respectively, for obtaining the corresponding accumulated values. Further, whether an interference source exists at the direction of each radar beam area can be decided, as step S910.

In more detail, as step S912, after the accumulated values of all radar beam areas are calculated, each accumulated value of all radar beam areas is compared with the above-described interference source reference level to see whether the accumulated value is larger than the reference level. For those radar beam areas where the value are larger than the interference source reference level, a conclusion that an interference source exists at the area direction can be made and outputting logic-1 data, as described in step S914. Otherwise, it is decided that there is no interference source and outputting logic-0 data, as step S918. Finally, as step S920, the determined result is saved in a memory.

Referring to FIG. 3 again, the clutter map establishing module 306 is mainly used for receiving range cell data to generate a clutter threshold value to detect a target.

Figure 10:
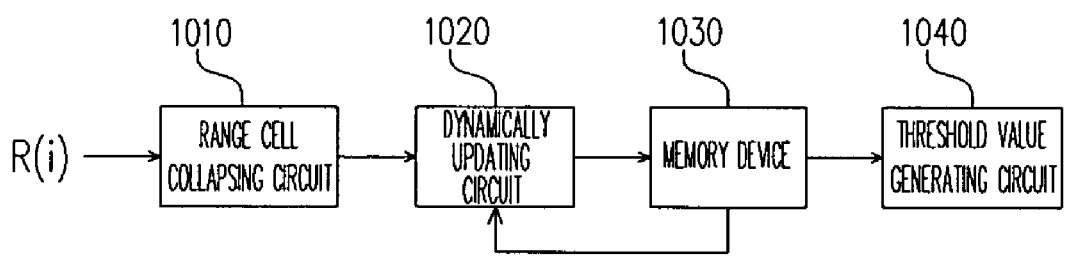
FIG. 10 is a circuit block diagram of a clutter map establishing module according to an embodiment of the present invention.

FIG. 10 is a circuit block diagram of a clutter map establishing module according to an embodiment of the present invention. Referring to FIGS. 3 and 10, the above-described clutter map establishing module 306 can include a range cell collapsing circuit 1010, a dynamically updating circuit 1020, a memory device 1030 and a threshold value generating circuit 1040.

Figure 11:
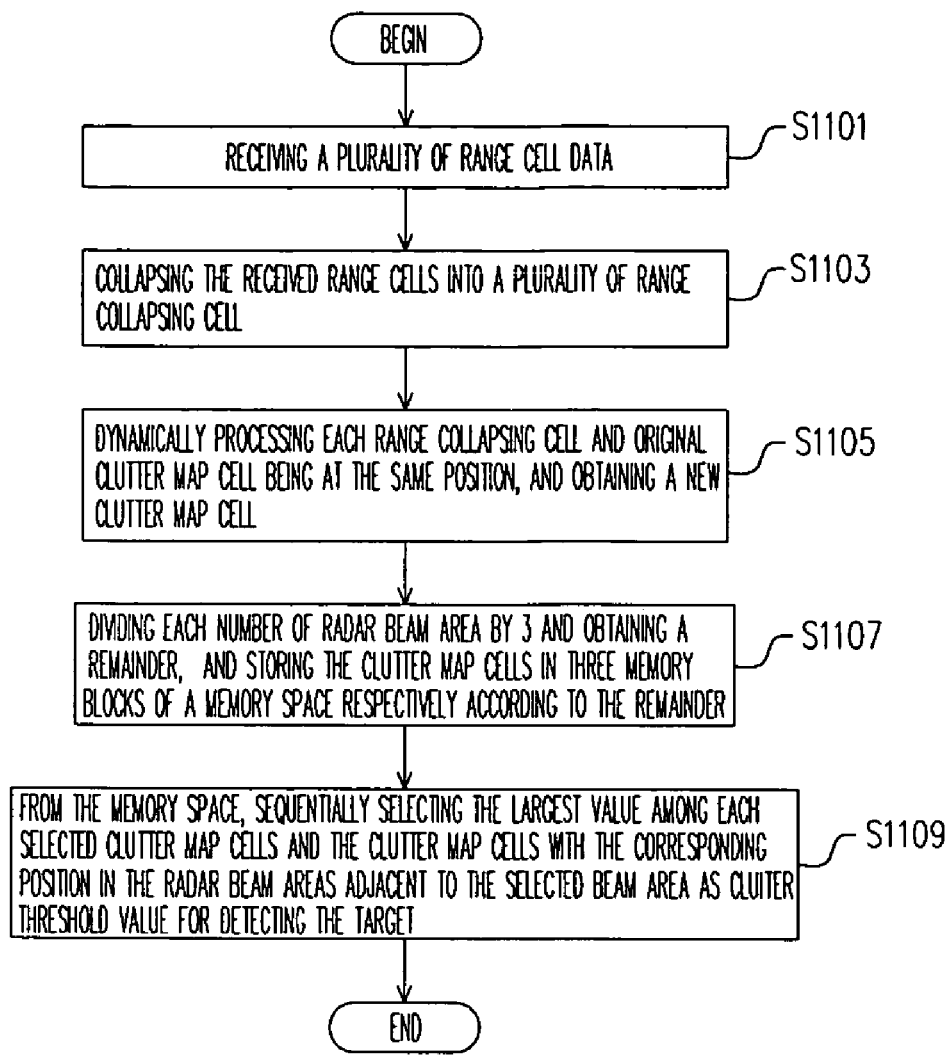
FIG. 11 is a flowchart of a method for establishing a clutter map according to an embodiment of the present invention.

FIG. 11 is a flowchart of a method for establishing a clutter map according to an embodiment of the present invention. Referring to FIGS. 10 and 11, for the clutter map establishing module 306 to generate the clutter threshold value, the range cell collapsing circuit 1010 receives a plurality of range cell data R(i) first, as described at step S1101. Due to tremendous data of all range cells in the entire detection space, as described at step S1103, a range cell collapsing circuit 1010 is needed to properly collapse all the received range cell data R(i) into a plurality of range collapsing cells, so that the storing space in the memory device 1030 can be saved. Next, as described in step S1105, the dynamically updating circuit 1020 dynamically updates each range collapsing cell and original clutter map cell of the memory device 1030 at the same position to obtain a new clutter map cell. Then, as illustrated in step S1107, the dynamically updating circuit 1020 divides each number of radar beam area by 3 to obtain a remainder, and stores the clutter map cells in three memory blocks of a memory space respectively according to the remainder. When the threshold value generating circuit 1040 generates the clutter threshold value, each clutter map cell is selected from the memory device and the clutter map cells with the corresponding position in the beam areas adjacent to the selected beam area are selected too. The largest value among these selected clutter map cells is selected as a clutter threshold value for detecting the target, as shown in step S1109.

Figure 12:
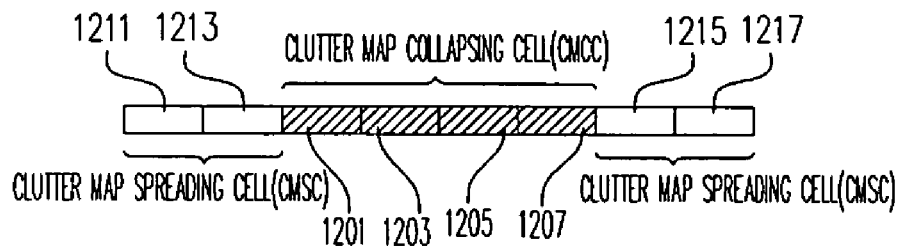
FIG. 12 is a diagram showing a collapsed range cell according to an embodiment of the present invention.

FIG. 12 is a diagram showing a collapsed range cell according to an embodiment of the present invention. Referring to FIG. 12, the range cell collapsing scheme in the present invention is to divide all range cells of a radar beam area into a plurality of range collapsing cells, wherein a clutter map collapsing cell (CMCC) includes a first preset number of range cells. For example, in FIG. 12, a clutter map collapsing cell includes four range cells, 1201, 1203, 1205 and 1207. A second preset number of range cells adjacent each clutter map collapsing cell is defined as clutter map spreading cells (CMSCs). Wherein, CMCC□2CMSC. In the embodiment, each CMSC has two range cells; therefore, there are the range cells 1211 and 1213 and the range cells 1215 and 1217 at both ends, respectively. Each range collapsing cell of the present invention comprises a clutter map collapsing cell plus two adjacent CMSCs.

Figure 13:
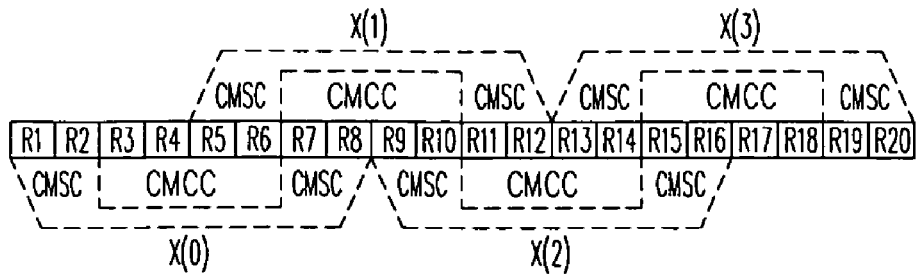
FIG. 13 is a diagram showing how the value of each range collapsing cell is decided according to an embodiment of the present invention.

FIG. 13 is a diagram showing how the value of each range collapsing cell is decided according to an embodiment of the present invention. Referring to FIG. 13, a part of range cell data of a radar beam area, R1~R20, are illustrated. Wherein, X(0), X(1), X(2) and X(3) represent four range collapsing cells, respectively, while CMCC and CMSC represent clutter map collapsing cell and clutter map spreading cell, respectively. To determine the value of each range collapsing cell in the present invention, all values of all range cells distributed in both CMCC and two CMSCs adjacent to the CMCC are compared with each other and the largest one is chosen as the value of the corresponding range collapsing cell.

For example, to determine the value of range collapsing cell X(0), all values of all range cells distributed in both CMCC and two CMSCs adjacent to the CMCC, i.e. R1, R2, R3, R4, R5, R6, R7 and R8, are compared with each other and the largest one is chosen as the value of the range collapsing cell X(0).

Since a CMCC is taken as a basic unit to determine the value of every range collapsing cell, there must be some range cell data within each range collapsing cell, which are compared in duplicate way. For example, to generate the values of X(0) and X(1), the range cell data R5, R6, R7 and R8 are compared repeatedly.

Figure 14:
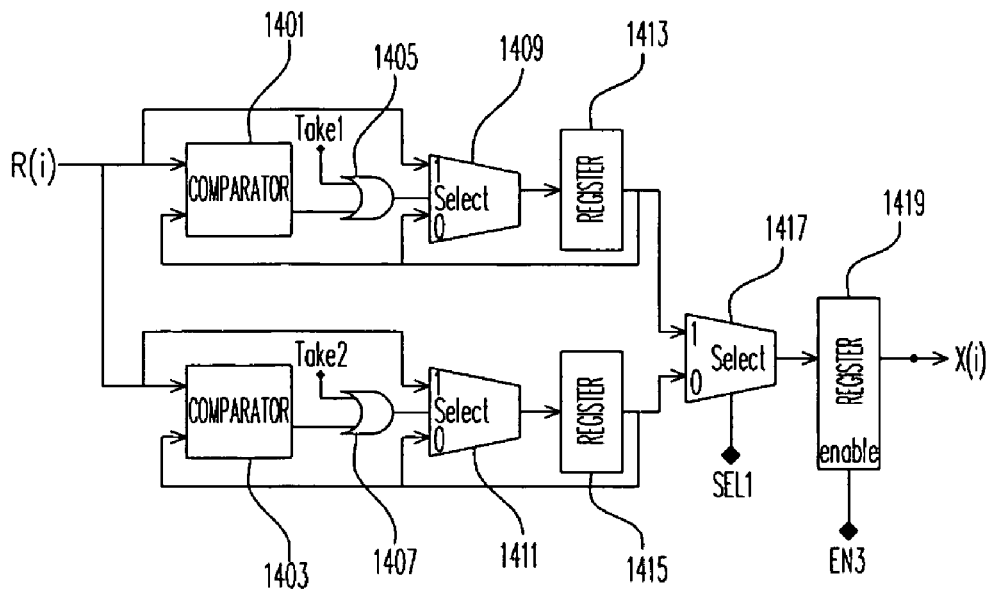
FIG. 14 is a schematic circuit of a range cell collapsing circuit according to an embodiment of the present invention.

FIG. 14 is a schematic circuit of a range cell collapsing circuit according to an embodiment of the present invention. Referring to FIG. 14, a range cell collapsing circuit includes a pair of comparators 1401 and 1403, a pair of OR gate circuits 1405 and 1407, a pair of multiplexers 1409 and 1411, a pair of registers 1413 and 1415, a multiplexer 1417 and a register 1419. Wherein, the couplings of the comparator 1401, the OR gate circuit 1405, the multiplexer 1409 and the register 1413 are the same as the corresponding 1403, 1407, 1411 and 1415, respectively. For simplicity, only one set of them is explained hereafter.

One of input ends of the comparator 1401 receives the range cell data R(i) through the input of the above-described clutter map establishing module 306, while another input end thereof is coupled to the output end of the register 1413. The comparator 1401 sends the output signal to the OR gate circuits 1405. One of input ends of the OR gate circuits 1405 is coupled to the output end of the comparator 1401, while another input end thereof receives an acquisition signal take1. The unique point of the OR gate circuits 1407 from the OR gate circuits 1405 is that the OR gate circuits 1407 receives a different acquisition signal take2. The multiplexer 1409 has two input ends (1 and 0), which are coupled to two input ends of the comparator 1401. The selection end 'select' of the multiplexer 1409 receives the output from the OR gate circuit 1405, so that the multiplexer 1409 is able to choose the input end 1 or 0 to send the received data to the register 1413 according to the output from the OR gate circuit 1405. The register 1413 would feedback the output signal from the multiplexer 1409 to both the comparator 1401 and the multiplexer 1409. Furthermore, the output signal from the multiplexer 1409 is sent to one input of the multiplexer 1417 (input end 1).

The multiplexer 1417 has also two input ends, the input ends 0 and 1. Wherein, the input end 1 is coupled to the output of the register 1413, while input end 0 is coupled to the output of the register 1415. The multiplexer 1417 has a selection end 'select' too for receiving a selection signal SEL1. Therefore, the multiplexer 1417 is able to choose the input end 1 or 0 to send the received signal to the register 1419 according to the selection signal SEL1. The register 1419 has an enabling end 'enable' for receiving an enabling signal EN3. When the register 1419 is enabled, the data X(i) of range collapsing cells are outputted.

Figure 15:
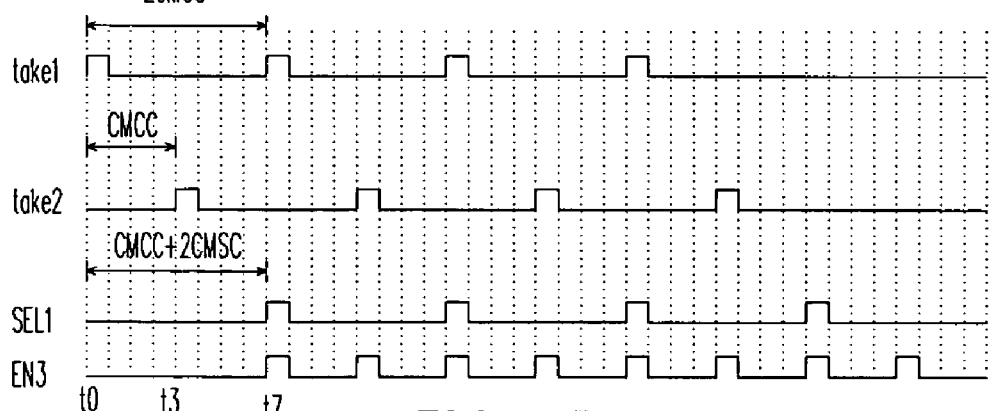
FIG. 15 is a control signal timing chart corresponding to the range cell collapsing circuit in FIG. 14.

FIG. 15 is a control signal timing chart corresponding to the range cell collapsing circuit in FIG. 14. Referring to FIG. 15, when the first range cell data R(1) is sent to the above-described clutter map establishing module 306, the signal would arrive at the comparator 1401 and one of the input ends of the multiplexer 1409. At the time point t0, the acquisition signal take1 is logic-1, while the acquisition signal take2 is logic-0, so that the multiplexer 1409 would choose the input range cell data R(1) to be outputted to the register 1413.

The second range cell data R(2) is sent to the comparator 1401. The comparator 1401 would compare the output R(1) from the register 1413 with the latest input range cell data R(2). If the output from the register 1413 is larger than the latest input range cell data, the comparator 1401 will output a logic-0. After the range cell data R(1) passes the OR gate circuit 1405, the acquisition signal take1 is transited to 0, which makes the output from OR gate circuit 1405 is just the output of the comparator 1401. Therefore, when the comparator 1401 outputs a logic-0 signal, the multiplexer 1409 would choose the input end 0, i.e. the output from the register 1413 is as the output of the multiplexer 1409 to be sent to the register 1413. On the other hand, when the latest input range cell data is larger than the output from the register, the comparator 1401 would output a logic-1 signal, so that the multiplexer 1409 chooses the input end 1, i.e. the latest input range cell data is sent to the register 1413.

At time point t3 the acquisition signal take2 is transited to logic-1, occurring with which the comparator 1403, the OR gate circuit 1407, the multiplexer 1411 and the register 1415 would work as the above-mentioned ones of corresponding 1401, 1405, 1409 and 1413, respectively.

At time point t7 the selection signal SEL1 is transited to logic-1 and the enabling signal EN3 is transited to high-level. Hence, the multiplexer 1417 chooses input end 1, i.e. the output from the register 1413, as the output of the multiplexer 1417 and sends to the register 1419. Further, the register 1419 takes the input from the multiplexer 1417 as the data of range collapsing cell for output.

Meantime, the acquisition signal take1 is transited to logic-1 again, and another new cycle begins, as described above.

Although FIGS. 14 and 15 illustrate the embodiment of the present invention, but the present invention should not be limited to the configuration shown in FIGS. 14 and 15. Anyone skilled in the art can modify the above-described configuration. In fact, the preset numbers of range cells included by a CMCC and a CMSC can be different from the above-described depending on the real need.

Referring to FIG. 10 again, due to some un-wanted objects (e.g. cloud or rain) generating the clutters move according to time variation, the radar system will dynamically update each echo signal data to the clutter map. Therefore, in the preferred embodiment, the dynamically updating circuit is disposed to generate the newest clutter information according to time variation.

Figure 16:
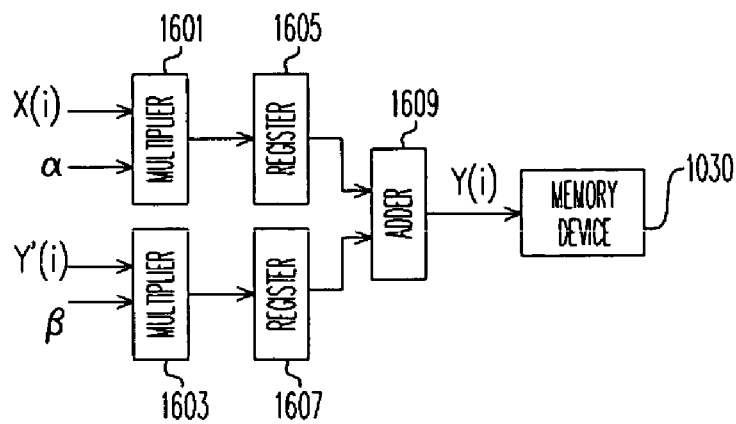
FIG. 16 is a block diagram of a dynamically updating circuit according to an embodiment of the present invention.

FIG. 16 is a block diagram of a dynamically updating circuit according to an embodiment of the present invention. Referring to FIG. 16, the above-mentioned dynamically updating circuit 1020 can include multipliers 1601 and 1603. Wherein, the multiplier 1601 multiplies the output X(i) of the register 1419 shown in FIG. 14 by a preset value α, and the multiplier 1603 multiplies the output Y'(i) of the register 1921 shown in FIG. 19 by a preset value β, and α+β is equal to 1.

Continuing to FIG. 16, the outputs from the multipliers 1601 and 1603 are sent to an adder 1609 through the registers 1605 and 1607 for operation. The operation result is sent by the adder 1609 to the memory device 1030 for storing. The flow in FIG. 16 can be expressed by the following mathematic formula (1):

$$Y_n(i) = \alpha \cdot X_n(i) + \beta \cdot Y'_n(i), \alpha + \beta = 1, 0 \leq \alpha, \beta \leq 1 \quad (1)$$

Where, $Y_n(i)$ represents the i-th dynamically updated data of clutter map cell, and the subscript n represents the n-th beam area. $Y'_n(i)$ represents the i-th original data of clutter map cell in the register 1921 in FIG. 19, $X_n(i)$ represents the latest data of range collapsing cell in the register 1419 in FIG. 14 and the subscript n represents the n-th radar beam area.

During establishing a clutter map for the detection space of a radar system, the present invention would judge whether it is the first time to establish the clutter map. If it is the first time to establish the clutter map, the output $X_n(i)$ from the above-described register 1419 is just the output $Y_n(i)$ from the adder 1609. Otherwise, the dynamically updating circuit 1020 would perform dynamically updating jobs on each clutter map cell according to the above-mentioned formula (1). The updated clutter map cell data stores back at original position in the memory device 1030.

Figure 17:
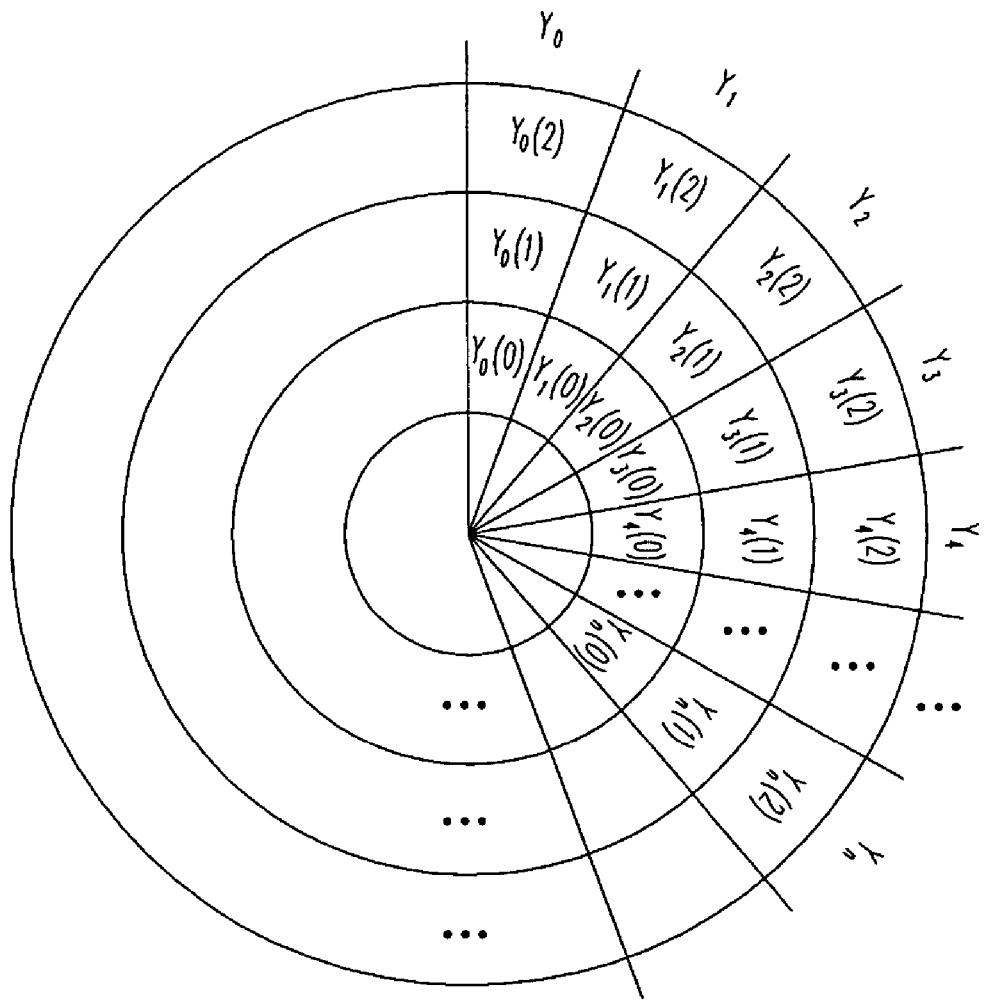
FIG. 17 is a diagram showing the distribution of all clutter map cells on an elevation layer in a detection space according to an embodiment of the present invention.
Figure 18:
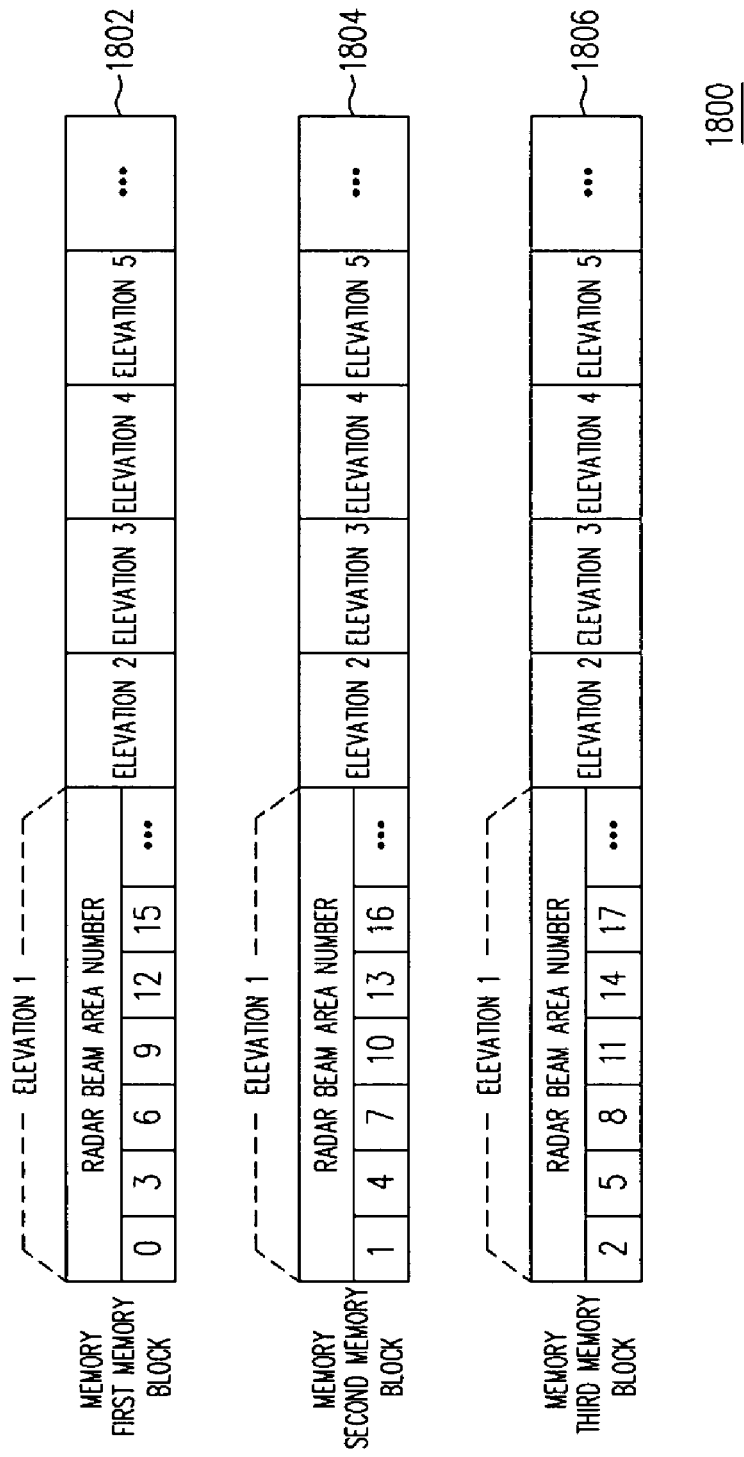
FIG. 18 is a diagram showing the internal architecture of the memory device in FIG. 10 according to an embodiment of the present invention.

FIG. 17 is a diagram showing the distribution of all clutter map cells on an elevation layer in a detection space according to an embodiment of the present invention. FIG. 18 is a diagram showing the internal architecture of the memory device 1030 in FIG. 10 according to an embodiment of the present invention. Referring to FIG. 17, FIG. 18 and FIG. 2, every elevation layer in the detection space can be divided into a plurality of radar beam areas according to a predetermined azimuth increment, for example, $Y_0 \sim Y_n$ in FIG. 17. When the range cell data R(i) are collapsed by the range cell collapsing circuit 1010 in FIG. 10, a plurality of data of clutter map cell is formed, for example, $Y_n(0) \sim Y_n(i)$ in FIG. 17.

The memory device 1030 in FIG. 10 can include a plurality of memory blocks; each memory block includes a plurality of memory regions. For example, a memory area 1800 in FIG. 18 can be divided into the memory blocks 1802, 1804 and 1806. Each of clutter map cell saves in corresponding memory block according to the remainder obtained by dividing each number of radar beam area by 3. If the remainder is equal to zero, the corresponding clutter map cell should be stored in the first memory block. If the remainder is equal to one, the corresponding clutter map cell should be stored in the second memory block. If the remainder is equal to two, the corresponding clutter map cell should be stored in the third memory block. After the clutter map cell data of different beam area in the same elevation layer is stored sequentially, the clutter map cell data in the other elevation layer is also stored. Each clutter map data of beam area is stored in corresponding memory block according to beam area number and elevation layer as above-mentioned. The rule as above mentioned only arranges the position sequence of the memory, but not limits establishing or updating sequence for the clutter map cell of beam area of different orientation. In other words, each clutter map cell of beam area of different orientation can be established or updated by one.

For example, memory block 1802 storing the clutter map cell data $Y_0(0)$ $Y_0(1)$ $Y_0(2)$ ... $Y_0(i)$ of beam area 0 of elevation layer 1, the clutter map cell data $Y_3(0)$ $Y_3(1)$ $Y_3(2)$ ... $Y_3(i)$ of beam area 3 of elevation layer 1, and clutter map cell data $Y_6(0)$ $Y_6(1)$ $Y_6(2)$ ... $Y_6(i)$ of beam area 6 of elevation layer 1. After above clutter map cell data of elevation layer 1 is stored in the memory block 1802, it is storing the data of the same beam areas of elevation layer 2 and so on. In addition, the memory block 1804 stores the clutter map cell data $Y_1(0)$ $Y_1(1)$ $Y_1(2)$ ... $Y_1(i)$ of beam area 1 of elevation layer 1, the clutter map cell data $Y_4(0)$ $Y_4(1)$ $Y_4(2)$ ... $Y_4(i)$ of beam area 4 of elevation layer 1, and the clutter map cell data $Y_7(0)$ $Y_7(1)$ $Y_7(2)$ ... $Y_7(i)$ of beam area 7 of elevation layer 1. After above clutter map cell data of elevation layer 1 is stored in the memory block 1804, it is storing the data of the same beam areas of elevation layer 2 and so on.

Figure 19:
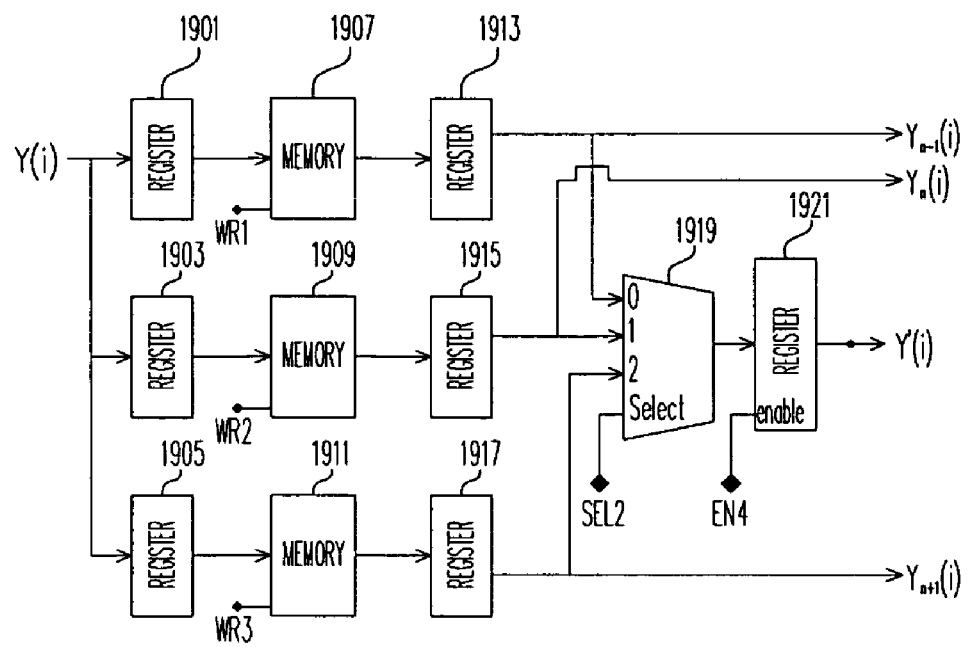
FIG. 19 is a circuit block diagram of the memory device in FIG. 10 according to an embodiment of the present invention.

FIG. 19 is a circuit block diagram of the memory device 1030 in FIG. 10 according to an embodiment of the present invention. Referring to FIG. 19, the memory device 1030 can include registers 1901, 1903, 1905, 1913, 1915 and 1917, memories 1907, 1909 and 1911, a multiplexer 1919 and a register 1921. Wherein, the register 1901 receives the data of clutter map cells Y(i) produced by the above-described dynamically updating circuit 1020 and connects the output thereof to the memory 1907. The memories 1907, 1909 and 1911 are equivalent to the memory blocks 1802, 1804 and 1806 in FIG. 18. The register 1913 receives the output from the memory 1907 and connects the output thereof to the multiplexer 1919 and threshold value generating circuit.

The couplings of the memory 1909, the registers 1903 and 1915, the couplings of the memory 1911, the registers 1905 and 1917 and the couplings of the memory 1907, the registers 1901 and 1913 are the same; for simplicity, the description thereof is omitted herein. Each of the memories 1907, 1909 or 1911 has a writing end 'write' used for receiving writing signals WR1, WR2 and WR3, respectively.

Continuing to FIG. 19, the multiplexer 1919 has three input ends (0~2) used for receiving the outputs from the registers 1913, 1915 and 1917, respectively. Besides, the multiplexer 1919 further has a selection end 'select' for receiving a selection signal SEL2, according to which the multiplexer 1919 chooses one of the ends 0, 1 and 2 to send the output thereof to the register 1921. The register 1921 also has an enabling end 'enable' used for receiving an enabling signal EN4. The output Y'(i) of register 1921 is feedback to the input of dynamically updating circuit 1020.

Figure 20:
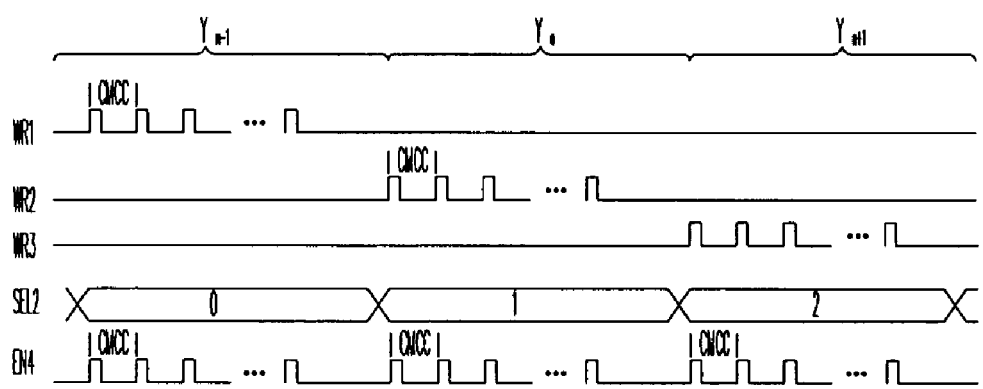
FIG. 20 is a control signal timing chart corresponding to the memory device in FIG. 19.

FIG. 20 is a control signal timing chart corresponding to the memory device in FIG. 19. Referring to FIG. 19 and FIG. 20, for example, the signal $Y_n(i)$ is original clutter map cell data extracted sequentially form memory 1909 and sent to input end 1 of multiplexer 1919 through register 1915. When selecting signal SEL2 is logic-1, the multiplexer 1919 selects the input end 1 as output. The enabling signal EN4 is enabled every period of CMCC, and the signal $Y_n(i)$ is sent to the register 1921 sequentially, i.e. signal $Y'_n(i)$. The signal $Y'_n(i)$ is sent to the dynamically updating circuit 1020, and processed a operation with new range collapsing cell $X_n(i)$ of the beam area, so that $Y_n(i)=\alpha \cdot Y_n(i)+\beta \cdot Y'_n(i)$ is obtained and the new clutter map cell data $Y_n(i)$ is sent back memory 1909 through register 1903. In addition, the writing signal WR2 of memory 1909 is enabled every period of clock of CMCC, and the signal $Y_n(i)$ is stored in original position of the memory.

Referring to FIGS. 10 and 11 again, once all data of clutter map cell of all radar beam areas on an elevation layer in the above-described detection space are stored into the memory device 1030. The threshold value generating circuit 1040 goes to step S1109 and generates the clutter threshold value to detect the target.

For example, assuming the data of clutter map cell $Y_1(1)$ of the radar beam area $Y_1$ of FIG. 17 is selected by the threshold value generating circuit 1040, a comparison among three data of clutter map cell, the $Y_1(1)$, $Y_0(1)$ corresponding to the adjacent radar beam area $Y_0$ and $Y_2(1)$ corresponding to the adjacent radar beam area $Y_1$, is performed (referring to FIG. 17), so that the largest value of the three data is selected as the clutter threshold value of the data of clutter map cell $Y_1(1)$.

Figure 21:
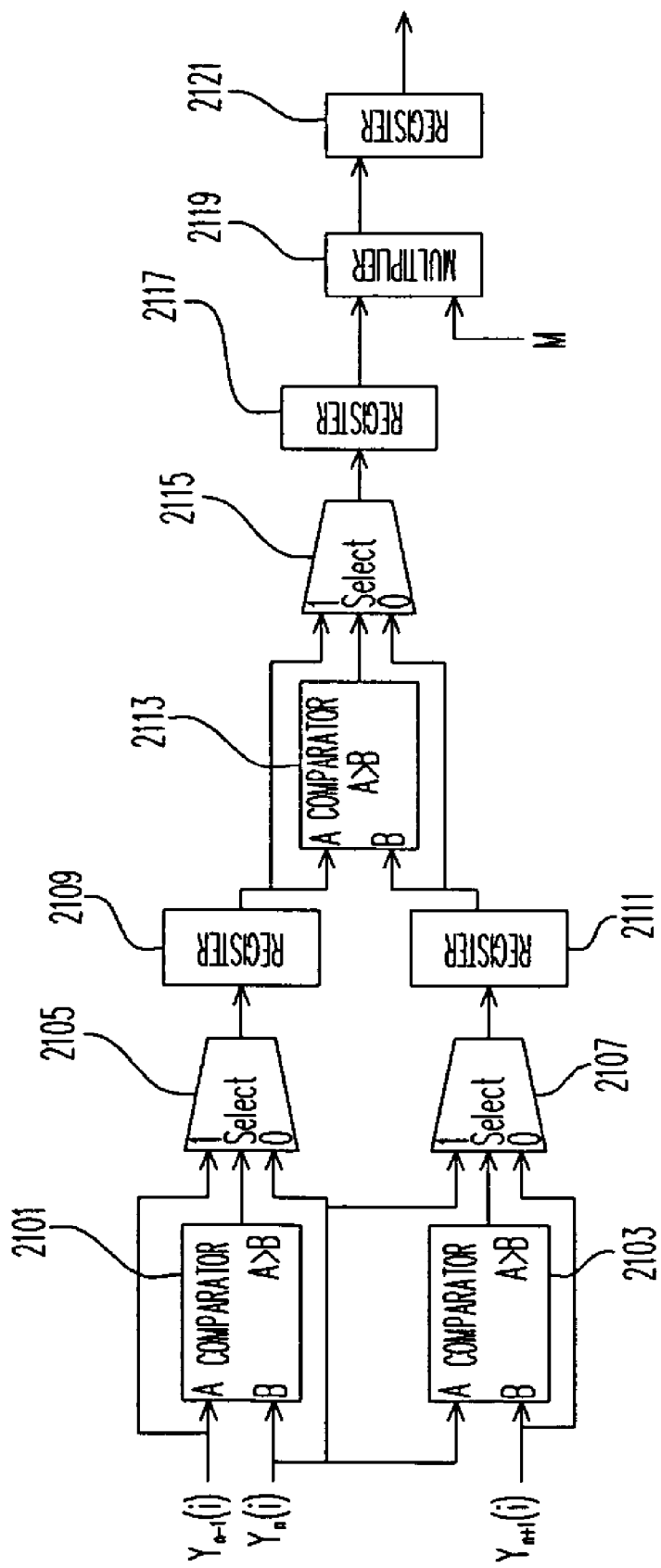
FIG. 21 is a block diagram of a threshold value generating circuit according to an embodiment of the present invention.

FIG. 21 is a block diagram of a threshold value generating circuit according to an embodiment of the present invention. Referring to FIG. 21, the threshold value generating circuit 1040 can include comparators 2101 and 2103. Wherein, the comparator 2101 receives the outputs from the registers 1913 and 1915 in FIG. 19, while the comparator 2103 receives the outputs from the registers 1915 and 1917 in FIG. 19. As the threshold value generating circuit 1040 selects a data of clutter map cell $Y_n(i)$ from one of the memories 1907, 1909 and 1911, the other two data of clutter map cell $Y_{n-1}(i)$ and $Y_{n+1}(i)$ corresponding to two adjacent radar beam areas and stored in two memory blocks, respectively, are selected too. Nevertheless, the present invention does not limit the above selection arrangement in FIG. 19, where the data of clutter map cell $Y_n(i)$, $Y_{n-1}(i)$ and $Y_{n+1}(i)$ are selected from the registers 1915, 1913 and 1917, respectively.

Once the comparator 2101 receives the data of clutter map cell $Y_{n-1}(i)$ and $Y_n(i)$, a comparison between them is performed. If $Y_{n-1}(i)$ is larger than $Y_n(i)$ an output of logic-1 is given; otherwise, the comparator 2101 outputs logic-0. Similarly, the comparator 2103 will compare the data of clutter map cell $Y_n(i)$ and $Y_{n+1}(i)$. If $Y_n(i)$ is larger than $Y_{n+1}(i)$, an output of logic 1 is given; otherwise, the comparator 2103 outputs logic-0.

The outputs from the comparators 2101 and 2103 are coupled to the selection ends 'select' of the multiplexers 2105 and 2107. Besides, the input ends 1 and 0 of the multiplexer 2105 receive the outputs from the register 1913 and 1915, respectively, while the input ends 1 and 0 of the multiplexer 2107 receive the outputs from the registers 1915 and 1917, respectively. Accordingly, the multiplexer 2105 would send the signal at input end 1 or 0 to the register 2109 according to the output of the comparator 2101, while the multiplexer 2107 would send the signal at input end 1 or 0 to the register 2111 according to the output of the comparator 2103.

Continuing to FIG. 21, after receiving the outputs from the registers 2109 and 2111, respectively, the comparator 2113 compares them with each other. If the output from the register 2109 is larger than the one from the register 2111, an output of logic-1 is given by the comparator 2113; otherwise, the comparator 2113 outputs logic-0. The input ends 1 and 2 of the multiplexer 2115 receive the outputs from the registers 2109 and 2111, respectively, and the selection end thereof receives the output from the comparator 2113. In this way, the multiplexer 2115 is able to select the largest value from the data of clutter map cell $Y_{n-1}(i)$, $Y_n(i)$ and $Y_{n+1}(i)$ and sends the largest value to the register 2117, followed by further sending the largest value to a multiplier. The multiplier 2119 multiplies the output from the register 2117 by a predetermined multiple M to generate the clutter threshold value for outputting from the register 2121.

From all the above described, the present invention has at least the following advantages:

1. Since the present invention has a clutter block detecting module, it is capable of using restricted memory resource processing dynamic disposition of the clutter map, in order to guide the radar system establishing dynamic clutter map or changing a searching mode (e.g. MTI) to reach retraining or canceling the clutter.

2. Since the present invention has an interference source detecting module, it is capable of automatically detecting every orientation for identifying the presence of an interference source. And the system executes an adaptive processing for the interference source like starting a electronic counter-countermeasures processing.

3. The method for storing clutter map and generating clutter threshold value is capable of retraining a false alarm rate resulted from the deviation of the radar beam, or non homogeneous clutter cross the boundary of the mountain and sea.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An apparatus for instantly automatic detecting clutter blocks and an interference source and for dynamically establishing a clutter map used for a radar system, comprising:
    a clutter block detecting module, receiving a plurality of range cell data, wherein each of the range cell data represents an echo intensity at a different distance of a radar beam area with an elevation and an azimuth in the detection space of the radar system respectively; the radar beam areas are divided into a plurality of detecting areas according to a predetermined range and when an accumulated value of a range cell data in a detecting area is larger than a clutter block level, the detecting area is defined as a clutter block;
    an interference source detecting module, receiving a plurality of range cell data, used for accumulating the range cell data of each radar beam area, followed by comparing the accumulated value with an interference source reference level to detect whether an interference source exists; and
    a clutter map establishing module, generates a plurality of the clutter map cell according to the range cells and the clutter map cells on different beam area store in three memory blocks sequentially, when one of the clutter map cells is extracted, two clutter map cells on adjacent beam area are also extracted, the largest value among the three clutter map cells regards as a clutter map threshold value to detect the target.

2. The apparatus for instantly automatic detecting clutter blocks and an interference source and for dynamically establishing a clutter map as recited in claim 1, wherein the clutter block detecting module comprises:
    a first accumulated unit, receiving the input of the clutter block detecting module and used for accumulating the range cell data of each detecting area;
    a first comparator, used for comparing the output from the first accumulated unit with the clutter block level, wherein if the output from the first accumulated unit is larger than the clutter block level, the first comparator produces a logic-1 output; otherwise, the first comparator produces a logic-0 output;
    a first memory device, coupled to the comparator and used for storing the output from the first comparator; and
    a counter, coupled to the comparator and used for counting the number of logic-1 signals produced by the comparator.

3. The apparatus for instantly automatic detecting clutter blocks and an interference source and for dynamically establishing a clutter map as recited in claim 2, wherein the first accumulated unit comprises:
    a first AND gate circuit, receiving the outputs from the first accumulated unit and a clearance signal;
    a first adder, used for adding the input of the clutter block detecting module to the output from the first AND gate circuit; and
    a first register, used for accumulating the output from the first adder, followed by sending the value to the first comparator.

4. The apparatus for instantly automatic detecting clutter blocks and an interference source and for dynamically establishing a clutter map as recited in claim 2, wherein the first memory device comprises a memory.

5. The apparatus for instantly automatic detecting clutter blocks and an interference source and for dynamically establishing a clutter map as recited in claim 1, wherein the interference source detecting module comprises:
    a second accumulated unit, receiving the input of the interference source detecting module and used for accumulating the range cell data of each radar beam area;
    a second comparator, used for comparing the output from the second accumulated unit with the interference source reference level, wherein if the output from the second accumulated unit is larger than the interference source reference level, the second comparator produces a logic-1 output; otherwise, the second comparator produces a logic-0 output; and
    a second memory device, coupled to the comparator and used for storing the output from the second comparator.

6. The apparatus for instantly automatic detecting clutter blocks and an interference source and for dynamically establishing a clutter map as recited in claim 5, wherein the second accumulated unit comprises:
    a second AND gate circuit, receiving the outputs from the second accumulated unit and a clearance signal;
    a second adder, used for adding the input of the interference source detecting module to the output from the second AND gate circuit; and
    a second register, used for accumulating the output from the second adder, followed by sending the value to the second comparator.

7. The apparatus for instantly automatic detecting clutter blocks and an interference source and for dynamically establishing a clutter map as recited in claim 5, wherein the second memory device comprises a memory.

8. The apparatus for instantly automatic detecting clutter blocks and an interference source and for dynamically establishing a clutter map as recited in claim 1, wherein the clutter map establishing module comprises a third memory device with three memory blocks and each memory block comprises a plurality of memory regions for sequentially storing the data of clutter map cell of each radar beam area on every elevation layer, respectively, and the clutter map cells on different beam area store in three memory blocks sequentially, when one of the clutter map cells is extracted, two clutter map cells on adjacent beam area are also extracted, the largest value among the three clutter map cells is regarded as a clutter threshold value to detect the target.

9. The apparatus for instantly automatic detecting clutter blocks and an interference source and for dynamically establishing a clutter map as recited in claim 8, wherein each memory block in the third memory device comprises:
    an third register, used for receiving the output from the dynamically updating circuit;
    a memory, used for storing the output from the third register; and
    a fourth register, used for receiving the output from the memory.

10. The apparatus for instantly automatic detecting clutter blocks and an interference source and for dynamically establishing a clutter map as recited in claim 8, wherein the third memory device comprises:
    a first multiplexer, used for receiving the outputs from the memory blocks and selecting one of outputs from the memory blocks as the output of the first multiplexer according to a second selection signal; and
    a fifth register, used for sending the output from the first multiplexer to the output end of the third memory device.

11. The apparatus for instantly automatic detecting clutter blocks and an interference source and for dynamically establishing a clutter map as recited in claim 8, wherein the memory blocks comprise a first memory block, a second memory block and a third memory block.

12. The apparatus for instantly automatic detecting clutter blocks and an interference source and for dynamically establishing a clutter map as recited in claim 8, wherein the clutter map establishing module further comprises a threshold value generating circuit comprises:
  a third comparator, used for comparing the output from the first memory block with the output from the second memory block, wherein if the output from the first memory block is larger than the output from the second memory block, the third comparator generates a logic-1 output; otherwise, a logic-0 output is generated;
  a fourth comparator, used for comparing the output from the second memory block with the output from the third memory block, wherein if the output from the second memory block is larger than the output from the third memory block, the fourth comparator generates a logic-1 output; otherwise, a logic-0 output is generated;
  a second multiplexer, used for receiving the outputs from the first memory block and the second memory block and selecting one of the first memory block output and the second memory block output as an output of the second multiplexer according to the output from the third comparator;
  a third multiplexer, used for receiving the outputs from the second memory block and the third memory block and selecting one of the second memory block output and the third memory block output as an output of the third multiplexer according to the output from the fourth comparator;
  a sixth register, used for receiving the output from the second multiplexer;
  an seventh register, used for receiving the output from the third multiplexer;
  a fifth comparator, used for comparing the output from the sixth register with the output from the seventh register, wherein if the output from the sixth register is larger than the output from the seventh register, the fifth comparator generates a logic-1 output; otherwise, a logic-0 output is generated;
  a fourth multiplexer, used for receiving the outputs from the sixth register and the seventh register and selecting one of the sixth register output and the seventh register output as an output of the fourth multiplexer according to the output from the fifth comparator;
  a eighth register, used for receiving the output from the fourth multiplexer;
  a multiplier, used for multiplying the output from the eighth register by a predetermined multiple to generate the clutter threshold value; and
  a ninth register, used for sending the output from the multiplier to the output end of the threshold value generating circuit.

13. A method for instantly detecting clutter blocks, suitable for a radar system, comprising the following steps:
  receiving a plurality of range cell data, wherein each of the range cell data represents an echo intensity at a different distance of a radar beam area with an elevation and an azimuth in the detection space of the radar system, respectively;
  dividing each of the radar beam areas into a plurality of detecting areas, wherein each detecting area comprises a preset number of range cell data;
  accumulating all the range cell data of each detecting area to obtain corresponding accumulated values;
  extracting the accumulated values of each detecting area;
  comparing the accumulated value of each detecting area with a clutter block level to get a comparison result; and
  deciding whether each of the detecting areas is a clutter block according to the comparison results.

14. The method for instantly detecting clutter blocks as recited in claim 13, wherein the steps for deciding whether a detecting area is a clutter block comprise:
  defining a detecting area as a clutter block if the value of a detecting area is larger than the clutter block level and outputting logic-1 signal, and storing in a memory device; and
  defining a detecting area as a non-clutter block if the value of a detecting area is less than the clutter block level, and outputting logic-0 signal, and storing in a memory device.

15. The method for instantly detecting clutter blocks as recited in claim 14, further comprising counting the number of the detecting areas with a value larger than the clutter block level.

16. A method for instantly detecting an interference source, suitable for a radar system, comprising the following steps:
  receiving a plurality of range cell data, wherein each of the range cell data represents an echo intensity at a different distance of a radar beam area with an elevation and an azimuth in the detection space of the radar system, respectively;
  accumulating all the range cell data of each radar beam area to obtain corresponding accumulated values;
  extracting the accumulated value of each radar beam area to obtain a value;
  comparing the value of each radar beam area with an interference source reference level to get a comparison result; and
  deciding whether an interference source exists at each of the radar beam area direction according to the comparison results.

17. The method for instantly detecting an interference source as recited in claim 16, wherein the steps for deciding whether an interference source exists comprise:
  determining whether there is an interference source at a radar beam area if corresponding accumulated value is larger than the interference source reference level and outputting logic-1 signal storing in a memory device; and
  determining whether there is no interference source at a radar beam area if corresponding accumulated value is less than the interference source reference level and outputting logic-0 signal storing in the memory device.

18. A method for establishing a clutter map, suitable for a radar system, comprising the following steps:
  receiving a plurality of range cell data, wherein each of the range cell data represents an echo intensity at a different distance of a radar beam area with an elevation and an azimuth in the detection space of the radar system respectively;
  collapsing all range cells of each radar beam area into a plurality of range collapsing cells and each range collapsing cell comprises a predetermined number of range cells;

dynamically processing each range collapsing cell and original clutter map cell at the same position, and obtaining a new clutter map cell;

storing all clutter map cells on the selected elevation layer in three memory blocks respectively; and when one of the clutter map cells is extracted, two clutter map cells on adjacent beam area are also extracted, the largest value among the three clutter map cells is regarded as a clutter threshold value to detect the target.

19. The method for establishing a clutter map as recited in claim 18, wherein the steps of storing each clutter map cell comprise:

Dividing each number of radar beam area by 3 and obtaining a remainder;

storing a corresponding clutter map cell to a first memory block of the memory blocks when the remainder is equal to zero;

storing a corresponding clutter map cell to a second memory block of the memory blocks when the remainder is equal to one; and storing a corresponding clutter map cell to a third memory block of the memory blocks when the remainder is equal to two.

20. The method for establishing a clutter map, suitable for a radar system as recited in claim 18, wherein the steps for generating the clutter threshold value further comprise multiplying the largest value among each clutter map cell of a selected radar beam area and the clutter map cells with the corresponding position at the radar beam areas adjacent to the selected radar beam area by a predetermined multiple.

* * * * *